Patented Mar. 18, 1941

2,235,702

UNITED STATES PATENT OFFICE 2,235,702

METHOD FOR THE REFINEMENT OF COPAL OILS, RESIN OILS, RESIN BALMS, AND THE LIKE

Rudolf Endres, Dessau-Rosslau, Germany, assignor, by mesne assignments, to "Patchem A.-G. Zur Beteiligung An Patenten und Sonstigen Erfindungsrechten Auf Chemische Verfahren," Zurich, Switzerland, a corporation of Switzerland No Drawing. Application March 6, 1937, Serial No. 129,352. In Germany March 7, 1936

6 Claims. (Cl. 260—106)

When copals are melted out, which is necessary to obtain the solubility in oils of those stuffs, an ill-smelling oil is distilling over, the colour of which turns easily dark in the air and until now it is applicable for technical purposes but to a small extent and merely in the form of cheap varnishes.

After several thorough attempts to enlarge the use of the copal oils for purposes of an economically higher value, it now has been found, that in treating the copal oils with hydrogen under a high partial pressure (at least 100 volumes of hydrogen 1 volume of substance) in the presence of hydrogenation-catalizers and at increased temperatures, one obtains a surprising improvement (refinement) of the initial material. By the treatment, where hydrogen is to be in a large excess at increased temperatures lying preferably between 200 and 400° C., the copal oils obtainable from Congo copal, Manila copal, kauri copal and the like, are converted into a water-clear or slightly yellowish and somewhat viscous liquid with neither an acid- nor a saponification-number, so that there are no carboxyl groups in it, but hydroxyl groups of an alcoholic character. By the transformation of the carboxyl groups in the copal oils into alcohol groups it is now possible to apply the thus refined copal oils for most heterogeneous technical purposes. The hydrogenation catalysts may be, for example, copper, manganese or chromium catalysts or combinations thereof.

In the same way as the copal oils do there are also other resin oils, resin balms and the like that allow of being likewise refined.

Example 1

300 g. of raw copal oil of Congo copal (saponification number 70.4, acid number 69.5) are heated up to 270–300° C. together with 30 g. of an active copper-manganese catalyzer in a stirring-autoclave of 4.5 litres for 1 hour and under a hydrogen pressure of 270 atm. After the catalyzer is filtered off a light-greenish liquid is obtained which at 10 mm. mercury pressure is distilling over between 120 and 220° C. and pleasantly smelling. The output amounts to approx. 90% of the initial material.

The reaction product, the acetyl-saponification number of which is 38.3, may be applied as solvent of a high boiling point (fluxing medium) for varnishes and especially for those to be dried in the furnace, further as an addition to varnishes rendering paper transparent (e. g. for "window-envelopes") and the like.

Example 2

In heating 400 g. of raw copal oil of kauri copal (saponification number 43.8, acid number 39.8) in the presence of 10% of a copper-chrome catalyzer in a shaking-autoclave of 2 litres, up to 300–350° C. for 1 hour and under a hydrogen pressure of 250 atm., one obtains, after filtering off, a somewhat greenish liquid distilling over under a 10 mm. mercury pressure at a temperature between 100 and 180° C. and being of an agreeable odour. The output amounts to approx. 92% of the initial material.

The reaction-product which possesses the acetyl-saponification number 27.6, allows of being applied as impregnating-oil for dust-binding media (mop-oils), also combined with vermin-combating-agents for spraying (fly destroyers), further for the manufacture of intaglio-printing-colours, solvent-soaps etc.

Example 3

In heating 400 g. of a half-liquid resin balm with 40 g. of a suitable hydrogenation-catalyzer up to 300–350° C. in a stirring autoclave of 4.5 litres for 1 hour and under a hydrogen pressure of 270 atm., one obtains, after filtering off from the catalyzer and distilling at 10 mm. mercury pressure, a liquid which is passing over at a temperature from 90 to 180° C., in a rather fluid state and of a slightly yellowish colour; it is of a pleasant turpentine oil-like smell and has neither an acid nor a saponification number, whereas the acetyl-saponification number is 71.9.

Example 4

In conducting every hour 500 g. of raw copal oil (acid number 64.2) together with 10 m.³ of hydrogen, under a pressure of 50 atm., through a reaction-space filled in with 2 litres of a suitable hydrogenation-catalyzer and heated up to 300–320° C. one obtains an almost colourless fluid reaction-product with the acetyl-saponification number 46.3, allowing to be advantageously co-employed in the manufacture of any sorts of polishing-means.

I claim:

1. The method of refining and converting copal oils into hydroxy compounds which comprises treating the same with at least 100 volumes of hydrogen at a temperature of about 200 to 400° C. and under high super-atmospheric pressure in the presence of hydrogenation catalysts of the group consisting of copper, manganese and chromium for about an hour and until the carboxyl groups are substantially eliminated and hydroxy compounds are produced.

2. The method of refining and converting copal oils into hydroxy compounds which comprises treating the same with at least 100 volumes of hydrogen at a temperature of about 270 to 350° C. and under high super-atmospheric pressure in the presence of hydrogenation catalysts of the group consisting of copper, manganese and chromium for about an hour and until the carboxyl groups are subtsantially eliminated and hydroxy compounds are produced.

3. The method of refining and converting copal oils into hydroxy compounds which comprises treating the same with at least 100 volumes of hydrogen at a temperature of about 270 to 300° C. and under a pressure of about 270 atmospheres in the presence of a copper-manganese hydrogenation catalyst for about an hour and until the carboxyl and acyl groups are substantially eliminated and hydroxy compounds are produced.

4. The method of refining and converting copal oils into hydroxy compounds which comprises treating the same with at least 100 volumes of hydrogen at a temperature of about 300 to 350° C. and under a pressure of about 250 atmospheres in the presence of a copper-chromium hydrogenation catalyst for about an hour and until the carboxyl and acyl groups are substantially eliminated and hydroxy compounds are produced.

5. The product of the process defined in claim 1.

6. The product of the process defined in claim 4.

RUDOLF ENDRES.